(12) United States Patent
Good et al.

(10) Patent No.: US 9,350,780 B2
(45) Date of Patent: *May 24, 2016

(54) INSERTION OF GRAPHIC OVERLAYS INTO A STREAM

(71) Applicant: WOWZA MEDIA SYSTEMS, LLC, Evergreen, CO (US)

(72) Inventors: Charles F. Good, Cincinnati, OH (US); Ian Zenoni, Highlands Ranch, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,176

(22) Filed: May 2, 2014

(65) Prior Publication Data

US 2014/0281014 A1    Sep. 18, 2014

Related U.S. Application Data

(63) Continuation of application No. 13/842,464, filed on Mar. 15, 2013, now Pat. No. 8,752,113.

(51) Int. Cl.
| | |
|---|---|
| *H04L 29/06* | (2006.01) |
| *H04N 21/2662* | (2011.01) |
| *H04N 21/472* | (2011.01) |
| *H04N 21/81* | (2011.01) |
| *H04N 21/845* | (2011.01) |
| *H04N 19/40* | (2014.01) |

(52) U.S. Cl.
CPC ............ *H04L 65/602* (2013.01); *H04L 65/608* (2013.01); *H04N 19/40* (2014.11); *H04N 21/2662* (2013.01); *H04N 21/47202* (2013.01); *H04N 21/8153* (2013.01); *H04N 21/845* (2013.01)

(58) Field of Classification Search
CPC ............ H04N 7/17318; H04N 21/235; H04N 21/435; H04N 7/165; H04N 7/173
See application file for complete search history.

(56) References Cited

U.S. PATENT DOCUMENTS

| | | | |
|---|---|---|---|
| 7,979,877 B2 | 7/2011 | Huber et al. | |
| 8,166,132 B1 | 4/2012 | Mooneyham | |
| 2002/0126990 A1* | 9/2002 | Rasmussen et al. | 386/68 |
| 2002/0178278 A1* | 11/2002 | Ducharme | 709/231 |

(Continued)

OTHER PUBLICATIONS

"How to Set Up and Run Wowza Transcoder AddOn for Live Streaming", http://www.wowza.com/forums/content.php?304, Oct. 7, 2011, Wowza Media Systems, LLC, 17 pages.

(Continued)

*Primary Examiner* — Benjamin R Bruckart
*Assistant Examiner* — Anthony Bantamoi
(74) *Attorney, Agent, or Firm* — Toler Law Group, PC

(57) ABSTRACT

A particular method includes receiving, at a media server, a request for a first rendition of a stream. The method also includes generating a portion of the first rendition. Generating the portion of the first rendition includes determining whether one or more first overlay images are enabled and inserting the one or more first overlay images into one or more frames of the portion of the first rendition conditioned on the one or more first overlay images being enabled. The method further includes sending the portion of the first rendition to a computing device.

20 Claims, 4 Drawing Sheets

(56) References Cited

U.S. PATENT DOCUMENTS

| | | | |
|---|---|---|---|
| 2004/0012717 A1 | 1/2004 | Sprague et al. | |
| 2008/0094511 A1* | 4/2008 | Lee et al. | 348/564 |
| 2008/0284798 A1* | 11/2008 | Weybrew et al. | 345/630 |
| 2010/0046639 A1* | 2/2010 | Bennett | 375/240.28 |
| 2011/0063317 A1 | 3/2011 | Gharaat et al. | |
| 2011/0243246 A1 | 10/2011 | Pettersson | |
| 2012/0324502 A1 | 12/2012 | Amsterdam et al. | |
| 2013/0024293 A1 | 1/2013 | Tinsman et al. | |
| 2013/0031582 A1 | 1/2013 | Tinsman et al. | |

OTHER PUBLICATIONS

"How to Add Graphic Overlays to Live Streams with Wowza Transcoder AddOn", http://www.wowza.com/forums/content.php?432, Oct. 8, 2012, Wowza Media Systems, LLC, 12 pages.

"Wowza Transocder AddOn Users Guide", Wowza Media Server 3, Downloaded from http://www.wowza.com/resources/WowzaTranscoderAddOn_UsersGuide.pdf, 2013, Wowza Media Systems, LLC, 24 pages.

* cited by examiner

INSERTION OF GRAPHIC OVERLAYS INTO A STREAM

CROSS-REFERENCE TO RELATED APPLICATIONS

The present application is a continuation of and claims priority to U.S. patent application Ser. No. 13/842,464, filed Mar. 15, 2013 and entitled "INSERTION OF GRAPHIC OVERLAYS INTO A STREAM", the content of which is incorporated by reference in its entirety.

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

When content is streamed via the Internet, a content provider may overlay additional information on a video stream. For example, a logo of the content provider (e.g., television channel, streaming website, et.) may be overlaid on the video stream. Due to the variety of device types, device sizes, and encoding technologies available to consumers, overlay processing may be complex when performed by a content provider. Overlays may also be performed by a client device receiving the stream. For example, a media player may overlay video controls (e.g., pause, play, rewind, fast forward, etc.) on top of the video stream being played. However, the client device may have access to limited information regarding the stream, and may thus be restricted to generating fairly basic overlays.

SUMMARY

Systems and methods of inserting graphic overlays (e.g., pictures and/or text) into a stream are disclosed. Advantageously, overlays may be inserted by a media server that acts as a transcoding intermediary between a live stream provider and a destination device. For example, the media server may receive a stream and may generate multiple versions (e.g., bitrates and frame sizes) of the stream for adaptive streaming. The media server may provide a flexible, application programming interface (API)-driven framework for overlays. Overlays may be added before and/or after video scaling is performed by the media server. For example, adding overlays before video scaling is performed may provide better performance, because images are added to only one stream. Conversely, adding overlays after video scaling may provide better-looking results (e.g., a specific overlay image can be provided for each frame size). Adding overlays after video scaling may also enable overlay granularity. For example, more images may be inserted into high-bitrate stream than into a low-bitrate stream.

DETAILED DESCRIPTION

Figure 1:
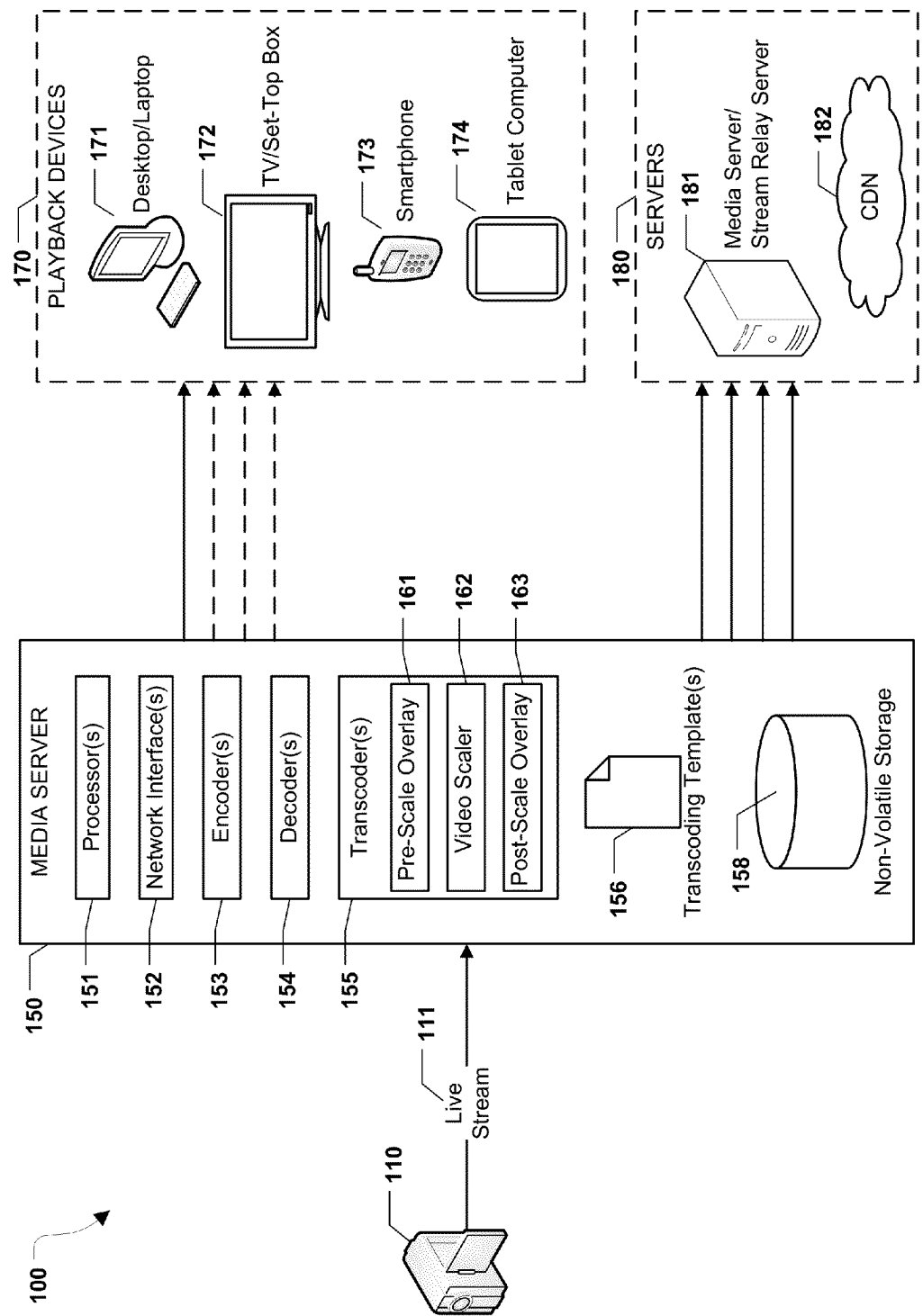
FIG. 1 is a diagram of a particular embodiment of a system that is operable to insert graphical overlays into a stream.

FIG. 1 is a diagram of a particular embodiment of a system 100 that is operable to insert graphical overlays into a stream. The system 100 includes a media server 150. The media server 150 is configured to send and receive data from various other devices (e.g., via a network, such as a local area network (LAN) or the Internet). For example, the media server 150 may communicate with one or more playback devices 170 (e.g., devices that are configured to output a display of a stream of live content) and one or more other servers 180. The media server 150 may include hardware components, software components, or a combination thereof, as further described herein.

The media server 150 may include one or more processors 151 and various components that are executable by the processor(s) 151. The media server 150 may correspond to software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the processor(s) 151), or any combination thereof.

The media server 150 may be accessible via a network (e.g., the Internet). The media server 150 may be located at a content distribution site, may be part of a cloud network or content delivery network, may be located in an individual customer or user premises, or may be in some other location. The media server 150 may include one or more network interfaces 152. For example, the network interface(s) 152 may include input interface(s) and output interface(s) that are configured to receive data and to send data, respectively. In a particular embodiment, the network interface(s) 152 may be wired and/or wireless interfaces that enable the media server 150 to communicate data via a network, such as the Internet. For example, the network interface(s) 152 may include an Ethernet interface, a wireless interface compatible with an Institute of Electrical and Electronics Engineers (IEEE) 802.11 (e.g., Wi-Fi) protocol, or other wired or wireless interfaces. In the embodiment of FIG. 1, the media server 150 receives a live stream 111 from a capture source 110 (e.g., a camera or a video encoder).

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be slightly delayed with respect to the event being captured, in accordance with government or industry regulations, such as delay regulations enforced by the Federal Communications Commission (FCC).

The media server 150 may also include one or more encoders 153, decoders 154, and transcoders 155, each of which may be implemented using hardware or software. For example, one or more of the encoder(s) 153, decoder(s) 154, and transcoder(s) 155 may be implemented using Java classes (e.g., executable by a Java Virtual Machine (JVM)), C++ instructions, C instructions, etc. The decoder(s) 154 may decode data received by the media server 150. For example, the decoder(s) 154 may decode received streams (e.g., live audio-only, video-only, or audio-video streams) and files (e.g., VOD items). The encoder(s) 153 may encode data that is to be transmitted by the media server 150. The encoder(s) 153 and decoder(s) 154 may thus enable the media server 150 to process data in accordance with multiple coding technologies and protocols.

For example, the media server 150 may support video encoding types including, but not limited to, H.264, On2 VP6, Sorenson Spark, Screen video, Screen video 2, motion picture experts group (MPEG) 2 (MPEG-2), and MPEG-4 Part 2. The media server 150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 150 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 150 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

In a particular embodiment, the media server 150 is configured to support adaptive streaming. Adaptive streaming is a media transmission mechanism that enables a receiving device to dynamically request different versions of a stream in response to changing network conditions. For example, one of the playback devices 170 (e.g., a desktop or laptop computing device 171, a television or set-top box 172, a smartphone 173, or a tablet computer 174) may initiate an adaptive streaming session with the media server 150. The media server 150 may send a manifest to the initiating device (e.g., the computing device 171). The manifest may include information describing each of a plurality of renditions of a stream item that are available for adaptive streaming. As used herein, a "rendition" of a live stream may correspond to a particular version of the live stream. Each rendition of a live stream may have a different bitrate (e.g., video bitrate and/or audio bitrate). Renditions may also differ from each other with respect to other audio and video quality parameters, such as frame size, frame rate, video CODEC, audio CODEC, number of audio channels, etc. The media server 150 may support adaptive streaming of multiple live streams to multiple devices, as further described herein.

In the example of FIG. 1, there are four available renditions of the live stream 111. This is illustrated in FIG. 1 by four arrows between the media server and the playback devices 170. However, it will be noted that only one of the arrows is solid, whereas the remaining arrows are dashed. This is to indicate that although four renditions are "available" only one of the renditions may be sent to a particular playback device 170 at any given time. Different renditions of the same live stream 111 may be sent to different playback devices at the same time. In alternate embodiments, more than four or fewer than four renditions may be available for adaptive streaming. Upon receiving the manifest, the computing device 171 may determine which of the available renditions of the live stream 111 should be requested from the media server 150. For example, the computing device 171 may make such a determination based on buffering/processing capability at the computing device 171 and/or network conditions being experienced by the computing device 171.

Upon determining which rendition should be requested, the computing device 171 may transmit a request to the media server 150. The request may specify a particular portion (e.g., portion "X") of the requested rendition. Depending on the adaptive streaming protocol in use, the requested portion may correspond to a "chunk" of a rendition and/or a group of pictures (GOP). A "chunk" may refer to a fixed length duration (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the computing device 171 may request a subsequent portion (e.g., portion "X+1") of the same rendition of the live stream 111. However, if playback and/or network conditions become worse, the computing device 171 may switch to a lower bitrate rendition by requesting subsequent portions of the lower bitrate rendition. Conversely, if playback and/or network conditions improve, the computing device 171 may switch to a higher bitrate rendition. The transcoder(s) 155 may generate key frame aligned portions for the adaptive streaming renditions, so that switching to a lower bitrate or higher bitrate rendition appears "seamless" (e.g., does not result in noticeable visual glitches or dropped frames at the computing device 171).

The transcoder(s) 155 may be configured to transcode the live stream 111 (or portions thereof) to generate additional renditions of the live stream 111 (or portions thereof). The transcoder(s) 155 may be configured to perform bitrate conversion, CODEC conversion, frame size conversion, etc. Depending on a format of the live stream 111, a playback format supported by a requesting device, and/or transcoding parameters in use, a transcoding operation performed by the transcoder(s) 155 may trigger a decoding operation by the decoder(s) 154 and/or a re-encoding operation by the encoder(s) 153. In a particular embodiment, parameters used by the transcoder(s) 155 are stored in one or more transcoding templates 156. For example, the transcoding template(s) 156 may be computer-readable files (e.g., eXtensible markup language (XML) files) that define transcoding parameters (e.g., bitrate, type of CODEC, etc.) for various stream renditions.

The media server 150 may also transmit multiple renditions of streams to other servers 180. For example, the media server 150 may transmit stream renditions to another media server 181 or to a server (e.g., an edge server) of a content delivery network (CDN) 182. In alternate embodiments, more than four or fewer than four renditions may be transmitted.

When the media server 150 supports adaptive streaming, graphical overlays may be added to the live stream 111 at various times during video processing. For example, a graphical overlay may be added to the live stream 111 before the live stream 111 is transcoded into one or more of the multiple renditions. As another example, a graphical overlay may be added to an individual rendition during or after transcoding.

To illustrate, the transcoder(s) 155 may include a pre-scale overlay module 161, a video scaler 162, and a post-scale overlay module 163. The pre-scale overlay module 161 may insert one or more images into a decoded version of the live stream 111 generated by the decoder(s) 154. As used herein, an "image" inserted into a stream may include graphics data and/or text data. The video scaler 162 may scale the decoded version of the live stream 111 into one or more scaled streams, where each of the scaled streams has a different frame size (e.g., resolution). The post-scale overlay module 163 may insert one or more images into the scaled streams prior to the encoder(s) 153 encoding the scaled streams for adaptive bitrate delivery.

In a particular embodiment, images to be inserted into a stream are retrieved from non-volatile storage 158 (e.g., disk-based storage) at the media server. Images may also be retrieved from a remote device via a network (e.g., the Internet) or from a network file system (NFS)-mounted storage device. Alternately, or in addition, overlays, or portions thereof, may be generated dynamically. For example, an image for insertion into a stream may be generated on the fly based on data in the transcoding template(s) 156 and/or data or executable code (e.g., code provided by a user, such as an owner or administrator of the media server 150). To illustrate, the transcoders(s) 155 may be implemented using one or more Java base classes and a user may generate custom transcoding classes that inherit from the base classes. For example, a custom class may be used to implement an overlay that is partially static and partially dynamic, such as an overlay that includes a logo (static) and a current date and time (dynamic). As used herein, an overlay may be "static" when at least one image for the overlay is retrieved from a storage location. An overlay may be "dynamic" when at least one image for the overlay is generated programmatically (e.g., at runtime of the media server 150). Additional examples of overlays are further described with reference to FIG. 2.

In a particular embodiment, the transcoder 155(s) support an application programming interface (API). The API may be used to provide code that is executable by the transcoder(s) during stream processing. For example, such executable code may define overlay configuration information, such as whether particular overlay graphics identified by the transcoding template(s) 156 are to be inserted by the pre-scale overlay module 161 prior to video scaling by the video scaler 162 or by the post-scale overlay module 163 after video scaling by the video scaler 162 is completed. The API may also enable additional overlay configurations, such as image rotation, text animation, fade-in/fade-out effects, etc.

During operation, the media server 150 may receive the live stream 111. The decoder(s) 154 may decode the live stream 111 to generate a decoded stream that is provided to the transcoder(s) 155. The pre-scale overlay module 161 may examine the transcoding template(s) 156 and/or executable code (e.g., custom classes provided by an owner or administrator of the media server 150) to determine whether any images are to be inserted into the decoded stream. For example, each time a frame of the decoded stream is generated, the pre-scale overlay module 161 may receive a callback. In response to the callback, the pre-scale overlay module 161 may examine the transcoding template(s) 156 and/or the executable code to determine whether any overlay images for the decoded stream are enabled, as further described with reference to FIG. 3. When one or more images are to be inserted into the decoded stream, the pre-scale overlay module 161 may retrieve the images (e.g., from the non-volatile storage 158) and/or dynamically generate the images. The pre-scale overlay module 161 may insert the retrieved/generated images into the decoded stream. When no images are to be inserted into the decoded stream, the pre-scale overlay module 161 may pass through the decoded stream without modification.

The video scaler 162 may receive the decoded stream (including any overlay graphics) and may scale the decoded stream to generate one or more scaled streams. Each of the scaled streams may have a different frame size (e.g., resolution). In a particular embodiment, the video scaler 162 may generate the scaled streams in accordance with parameters indicated by the transcoding template(s) 156. For example, the transcoding template(s) 156 may identify the number of scaled streams and properties of each scaled stream to be generated by the video scaler 162, as further described with reference to FIG. 3.

The post-scale overlay module 163 may receive the scaled streams and may determine, based on the transcoding template(s) 156 and/or executable code (e.g., custom classes provided by an owner or administrator of the media server 150), whether any images are to be inserted into any of the scaled streams. For example, each time a frame of a particular scaled stream is generated, the post-scale overlay module 163 may receive a callback. In response to the callback, the post-scale overlay module 163 may examine the transcoding template(s) 156 and/or the executable code to determine whether any overlay images for the particular scaled stream are enabled, as further described with reference to FIG. 3. When one or more images are to be inserted into a particular scaled stream, the post-scale overlay module 163 may retrieve the images (e.g., from the non-volatile storage 158) and/or dynamically generate the images. The post-scale overlay module 161 may insert the retrieved/generated images into the particular scaled stream. When no images are to be inserted into a particular scaled stream, the post-scale overlay module 161 may pass through the particular scaled stream without modification. The encoder(s) 153 may receive the scaled streams (including any overlay graphics) and may encode each of the scaled streams for adaptive bitrate delivery. The system 100 of FIG. 1 may thus enable insertion of graphical overlays at a media server (e.g., the media server 150) during transcoding.

Figure 2:
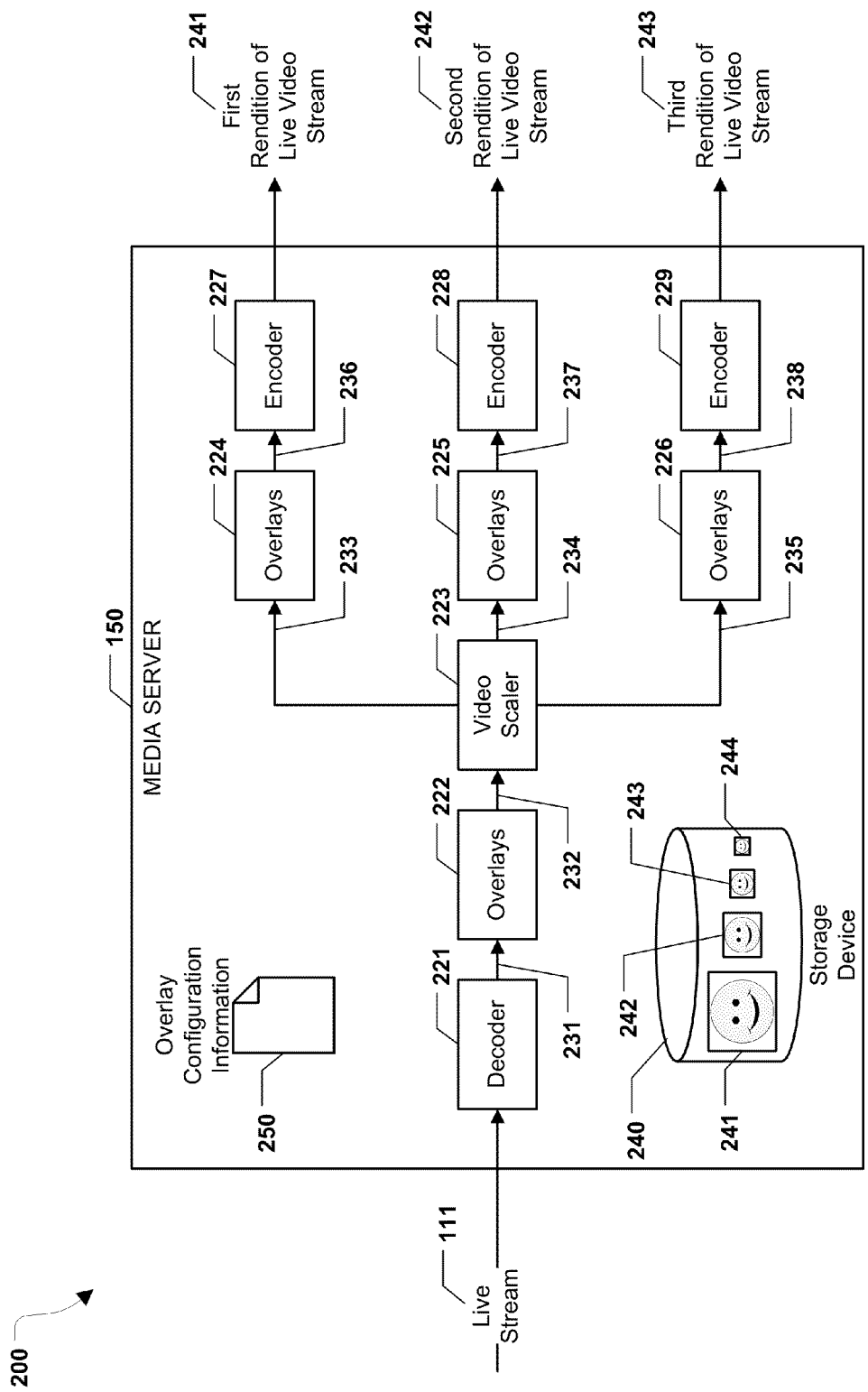
FIG. 2 is a diagram of another particular embodiment of a system that is operable to insert graphical overlays into a stream.

FIG. 2 is a diagram of another particular embodiment of a system 200 that is operable to insert graphical overlays into a stream. As illustrated in FIG. 2, the media server 150 may receive the live stream 111. For example, the live stream 111 may be received via a network interface, such as one of the network interface(s) 152 of FIG. 1. The live stream 111 may be represented in various formats, such as RTMP, RTP, MPEG-TS, etc. Audio and video data within the live stream 111 may be encoded using various formats or CODECs, such as H.264, MPEG-2, AAC, MP3, etc.

The live stream 111 may be input into a decoder 221. In an illustrative embodiment, the decoder 221 may be one of the decoder(s) 154 of FIG. 1. The decoder 221 may receive the live stream 111 and may decode the live stream (e.g., extract audio and video data out of incoming packets of the live stream 111) to generate a decoded stream 231. The decoder 221 may output the decoded stream 231 to a first overlay module 222.

In an illustrative embodiment, the first overlay module 222 may be the pre-scale overlay module 161 of FIG. 1. The first overlay module 222 may insert one or more images into at least one frame of the decoded stream 231 to generate an intermediate stream 232. Different images may be inserted into different locations of frames of the decoded stream 231. The first overlay module 222 may operate in accordance with settings defined by overlay configuration information 250.

For example, the overlay configuration information 250 may include the transcoding template(s) 156 of FIG. 1, executable code, or any combination thereof. The overlay configuration information 250 may identify specific overlay images, overlay locations within a frame, transparency levels, etc. An example of the overlay configuration information 250 is further described with reference to FIG. 3. The first overlay module 222 may output the intermediate stream 232 to a video scaler 223. When no images are to be inserted by the first overlay module 222, the first overlay module 222 may pass through the decoded stream 231 as the intermediate stream 232.

In a particular embodiment, the first overlay module 222 retrieves an image 241 from a storage device 240 and inserts the retrieved image into the one or frames of the decoded stream 231. The image 241 corresponds to a static overlay. Examples of static overlays include, but are not limited to, a watermark, a logo, and a static advertisement.

Alternately, or in addition, the first overlay module 222 may dynamically generate overlay images based on information generated at the media server 150 during stream processing, information retrieved from an external source, and/or executable code provided by a user. For example, dynamic overlays may be used to insert hidden watermarks to track stream origin and usage. As another example, dynamic overlays may be used to overlay a number of stream viewers on top of the stream. As yet another example, dynamic overlays may be used to add locale or usage specific overlays, such as news tickers with local news based on a viewer's location, local weather alerts, emergency broadcast information, etc. A dynamic overlay may also be used to indicate that there is an error or outage situation at a stream capture site.

The video scaler 223 may receive the intermediate stream 232 from the first overlay module 222 and may scale (e.g., resize) the intermediate stream 232 to generate one or more scaled streams. Scaling a stream may include changing a frame size (e.g., resolution) of the stream, changing an aspect ratio of the stream, adding or removing letterbox, or any combination thereof. In a particular embodiment, a frame of an input stream may be copied to a frame of an output rendition without scaling (i.e., the video scaler 232 may duplicate the input stream), and the output rendition may be used to add overlays. For example, to syndicate a stream to multiple destinations with destination-specific overlays, the stream may be duplicated by the video scaler 232, and different overlays may be added to each rendition of the stream based on the destination of that rendition. If the first overlay module 222 inserted any images into the intermediate stream 232, the inserted images are scaled as well. In an illustrative embodiment, the video scaler 223 may be the video scaler 162 of FIG. 1. In the example of FIG. 2, the video scaler 223 generates three scaled streams 233, 234, and 235 from the intermediate stream 232. In alternate embodiments, more than three or fewer than three scaled streams may be generated. Each of the scaled streams 233-235 may have a different frame size, aspect ratio, and/or letterbox settings. The scaled streams 233-235 may each have a larger and/or a smaller frame size than the live stream 111. Alternately, the intermediate stream 232 may be passed through (unsealed), as one of the scaled streams 233-235. Each of the scaled streams 233, 234, and 235 may be provided to a corresponding second overlay module 224, 225, and 226, respectively.

In an illustrative embodiment, the second overlay modules 224-226 may be the post-scale overlay module 163 of FIG. 1. Each of second overlay modules 224, 225, 226 may insert one or more images into at least one frame of the corresponding scaled stream 233, 235, 236 to generate a corresponding second intermediate stream 236, 237, 238. The second overlay modules 224-226 may operate in accordance with settings defined by the overlay configuration information 250. For example, each of the second overlay modules 224-226 may operate according to overlay parameters included in a section of the overlay configuration information 250 that is specific to the corresponding intermediate stream 236-238, as further described with reference to FIG. 3. The second intermediate streams 236, 237, 238 may be output to corresponding encoders 227, 228, 229. When no images are to be inserted, a scaled stream may be passed through without modification.

In a particular embodiment, each of the second overlay modules 224-226 is configured to retrieve one or more images from the storage device 240 for insertion into a scaled stream. Different images may be inserted into different scaled streams. Further, a different number of images may be inserted into different scaled streams. For example, more images may be inserted into a high frame size rendition of a stream and fewer images (or zero images) may be inserted into a low frame size (e.g., for mobile devices) rendition of the stream. For example, as shown in FIG. 2, the storage device 240 may store a different size image 242, 243, 244 for insertion into the different scaled streams 233, 234, 235. Using different size images for different scaled streams instead of a single image that is resized for the different scaled streams may result in better-looking (e.g., sharper text, less blurry graphics, etc.) overlays.

Alternately, or in addition, each of the second overlay modules 224-226 may dynamically generate overlay images based on information generated at the media server 150 during stream processing, information retrieved from an external source, and/or executable code provided in accordance with an API.

In a particular embodiment, different overlay settings may be defined for each of the second overlay modules 224-226. For example, different numbers and types of overlay graphics may be inserted into different streams. To illustrate, a high-definition (HD) version of a live stream corresponding to a televised football game may include multiple static and dynamic overlays, such as a television channel logo and a scoreboard including down-and-distance information and scores from other games. A low-resolution version of the live stream for streaming to mobile devices may include the logo but not the scoreboard, because the scoreboard may be difficult to read at low resolution. Different overlay settings may also be used for different purposes or audiences (e.g., syndicating a stream to different destinations or audiences with different destination-specific or audience-specific overlays).

The encoders 227-229 may receive and encode the second intermediate streams 236-238 to generate encoded streams. Each of the encoded streams may correspond to a rendition of the live stream 111 that is available for adaptive streaming. For example, in FIG. 2, the three encoders 227-229 generate three renditions 241-243 of the live video stream 111. One or more of the encoded streams may be sent to destination devices (e.g., one or more of the playback devices 170 of FIG. 1 and/or one or more of the servers 180 of FIG. 1) via adaptive streaming protocols (e.g., HLS, HDS, smooth streaming, and/or MPEG-DASH).

Although the foregoing description is associated with insertion of graphics "on top of" a live video stream, the described techniques may also be used to implement "underlays." For example, a video stream may have a z-order (e.g., layer depth) of zero. An image having a positive z-order may be inserted into a corresponding layer on top of the video stream. However, an image having a negative z-order may be inserted into a corresponding layer underneath the video stream. To illustrate, during a business presentation, images corresponding to presentation slides may have a negative z-order and may be placed underneath and a live video stream of a presentation speaker (which may be scaled to fit into a corner of the resulting output stream, similar to a picture-in-picture video).

In a particular embodiment, the first overlay module 222 and/or the second overlay modules 224-226 also supports "pinching" of video to accommodate overlay images. For example, in some situations it may be preferable to pinch or squeeze a video instead of covering up a part of the video with an overlay image (e.g., an advertisement). Thus, a frame of video may be "pinched" and an overlay image may be added to the vacated region of the frame.

It should be noted that the division of various functions between the components of the media server 150 in FIG. 2 is for illustration only. In alternate embodiment, one or more functions may be performed by a single component. For example, the first overlay module 222 may be part of the decoder 221 and the second overlay modules 224-226 may be part of the encoders 227-229. Various buffering points may be implemented as well. For example, the decoder 221 may buffer frames of decoded video for ingestion by the video scaler 223 and the video scaler 223 may buffer scaled frames for ingestion by the encoders 227-229.

The system 200 of FIG. 2 may thus provide a flexible, API-driven framework for overlays. Overlays may be added before and/or after video scaling is performed by the media server 150. For example, adding overlays before video scaling may provide better performance, because images are added to only one stream. Conversely, adding overlays after video scaling may provide better-looking results. Adding overlays after video scaling may also enable overlay granularity. For example, more images may be inserted into high-bitrate stream than into a low-bitrate stream. The system 200 of FIG. 2 may also enable monetization of live stream overlays. For example, an advertiser may be charged a fee for insertion of static or dynamic advertising into adaptive bitrate renditions of a live stream.

Figure 3:
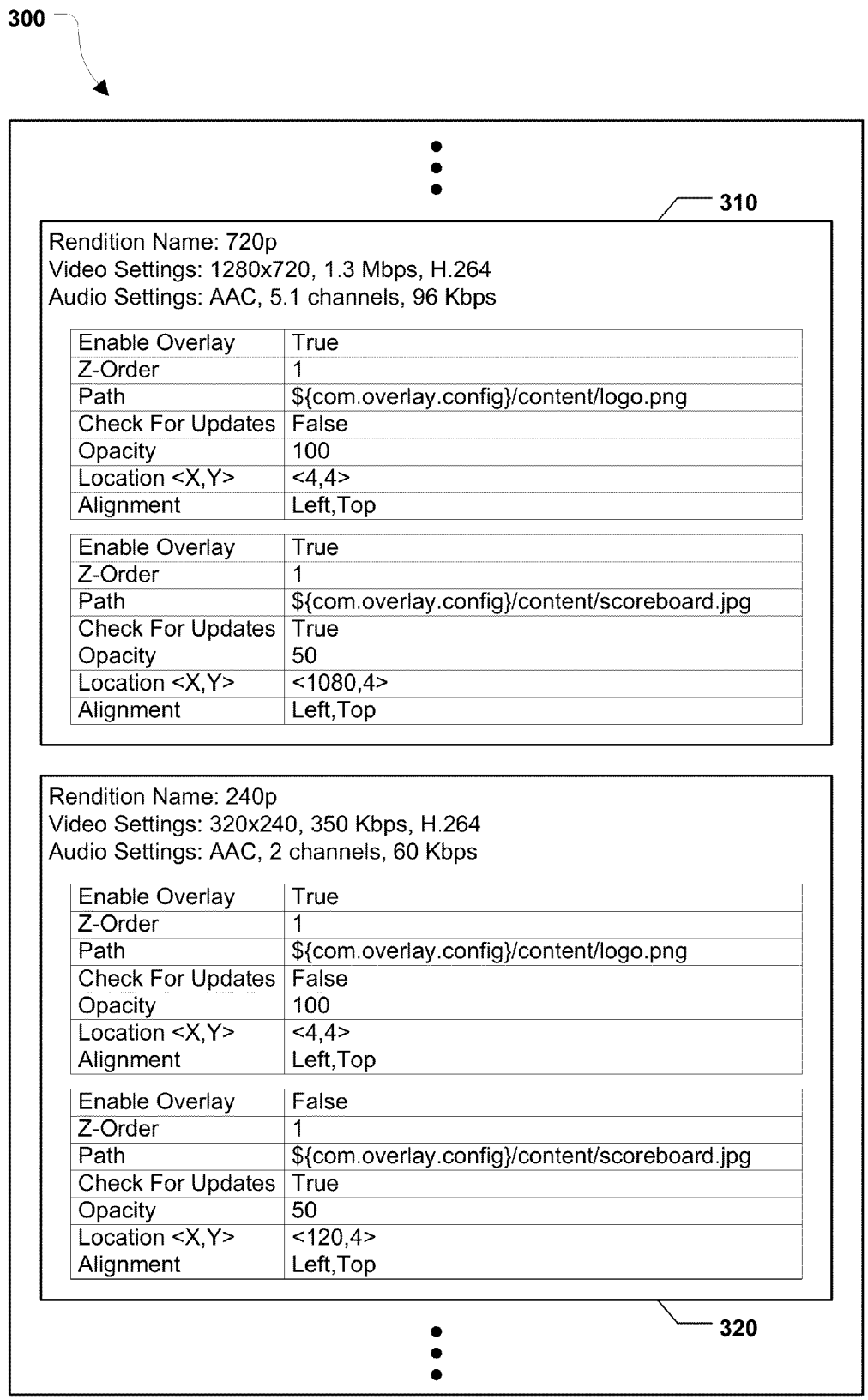
FIG. 3 is a diagram to illustrate a particular embodiment of overlay configuration information.

FIG. 3 is a diagram to illustrate a particular embodiment of overlay configuration information 300. For example, the overlay configuration information 300 may correspond to the transcoding template(s) 156 of FIG. 1 and/or the overlay configuration information 250 of FIG. 2.

In a particular embodiment, a media server (e.g., the media server 150 of FIG. 1) may support instantiation of one or more transcoding modules (e.g., the transcoder(s) 155 of FIG. 1). Each instantiated transcoding module may correspond to one or more executable software classes. A transcoding module may be added to a video processing flow for an "application" associated with a particular live stream. Thus, when multiple live streams are being received by a media server, multiple "applications" may be running, and each of the applications may or may not include a transcoding module in their video processing flow. Each transcoding module may have its own transcoding configuration (e.g., the transcoding template(s) 156 of FIG. 1). Thus, overlay settings defined for one application (i.e., live stream) may not be applied to other applications (e.g., other live streams).

The overlay configuration information 300 for a particular live stream may include audio, video, and overlay settings for various renditions of the live stream that are to be generated for adaptive streaming. For example, the overlay configuration information 300 may include settings for a first rendition 310 and a second rendition 320.

The first rendition 310 is a high-quality rendition that has a name "720p," a frame size of 1280×720 pixels, a video bitrate of 1.3 megabits per second, H.264 encoding, AAC audio encoding, 5.1 audio channels (i.e., 5 surround channels and 1 base channel), and an audio bitrate of 96 kilobits per second. In FIG. 3, two overlays are defined for the first rendition 310, and both overlays are enabled. The first overlay corresponds to a logo and the second overlay corresponds to a scoreboard. Overlay settings for each overlay include a z-order, an image path that may be used to retrieve an image, a display opacity in percent, a display location (e.g., <X,Y> coordinates) that the image is to be inserted into a video frame, and a display alignment (e.g., a horizontal alignment of left, right, or centered and a vertical alignment of top, bottom, or centered). In a particular embodiment, the overlay settings also include an option to "Check For Updates." When, enabled this option may cause the media server to periodically check for updates to the overlay image. The time period for checking for updates may be programmable by a user or may be fixed (e.g., 750 milliseconds). For example, the "Check For Updates" option for the scoreboard overlay is enabled. As data for the scoreboard changes (e.g., the current score changes), an updated image for the scoreboard may be pushed to the storage location identified by the image path for the scoreboard. By checking for updates to the scoreboard image, up-to-date scoreboard information may be inserted into the rendition 310.

The second rendition 320 is a lower-quality rendition that has a name "240p," a frame size of 320×240 pixels, a video bitrate of 350 kilobits per second, H.264 encoding, AAC audio encoding, 2 audio channels, and an audio bitrate of 60 kilobits per second. Both the logo overlay and the scoreboard overlay are defined for the second rendition 320, but only the logo overlay is enabled.

In a particular embodiment, overlay insertion is "sticky." That is, once an image is inserted in a particular location of a frame of a video stream, the image continues to be inserted into every subsequent frame of the video stream at the same location until the overlay configuration is changed (e.g., the location is changed, the overlay is disabled, etc.).

Figure 4:
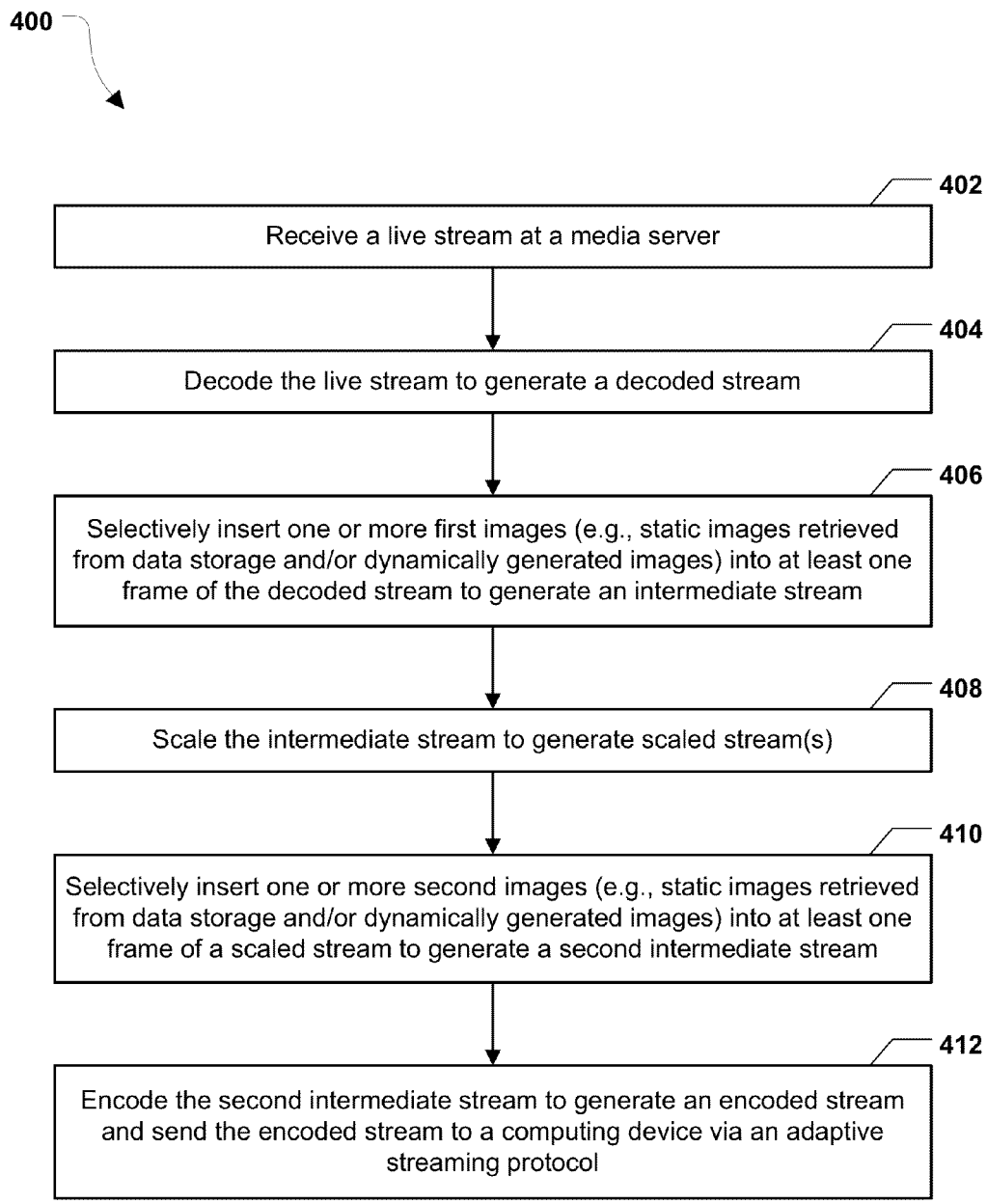
FIG. 4 is a flowchart to illustrate a particular embodiment of a method of inserting graphic overlays into a stream.

FIG. 4 is a flowchart to illustrate a particular embodiment of a method 400 of inserting graphic overlays into a stream. In an illustrative embodiment, the method 400 may be performed by the media server 150 of FIGS. 1-2.

The method 400 may include receiving a live stream at a media server, at 402, and decoding the live stream to generate a decoded stream, at 404. For example, in FIG. 2, the media server 150 may receive the live stream 111 and the decoder 221 may decode the live stream 111 to generate the decoded stream 231.

The method 400 may also include selectively inserting one or more first images into at least one frame of the decoded stream to generate an intermediate stream, at 406. For example, the one or more first images may include static images that are retrieved from data storage and/or dynamically generated images. In a particular embodiment, the media server 150 may determine whether or not to insert images into the decoded stream based on settings that are stored at the media server 150 and correspond to the live stream 111 (e.g., the transcoding template(s) 156 of FIG. 1, the overlay configuration information 250 of FIG. 2, and/or the overlay configuration information 300 of FIG. 3). When the settings indicate that no images are to be added to the decoded stream, the decoded stream may be passed through as the intermediate stream.

The method 400 may further include scaling the intermediate stream to generate scaled stream(s), at 408, and selectively inserting one or more second images into at least one frame of a scaled stream to generate a second intermediate stream, at 410. In a particular embodiment, the media server 150 may determine whether or not to insert images into the scaled stream based on the settings for the live stream 111 (e.g., the transcoding template(s) 156 of FIG. 1, the overlay configuration information 250 of FIG. 2, and/or the overlay configuration information 300 of FIG. 3). When the settings indicate that no images are to be added to the scaled stream, the scaled stream may be passed through as the second intermediate stream.

The method 400 may include encoding the second intermediate stream to generate an encoded stream and sending the encoded stream to a computing device via an adaptive streaming protocol, at 412. It should be noted that a media server (e.g., the media server 150 of FIGS. 1-2) may generate multiple such encoded streams. For example, each of the encoded streams may correspond to a rendition of the live stream that is available for adaptive streaming from the media server to a computing device. Thus, the steps 408-412 may be performed (e.g., in parallel) for each of multiple renditions of the live video stream.

Although one or more of the foregoing embodiments describe inserting graphical overlays into live streams, the described systems and methods may also be used to insert graphical overlays into other types of streams. For example, the described systems and methods may be used to insert graphical overlays into a video on demand (VOD) stream that corresponds to VOD content that is encoded on the fly for delivery from a media server (e.g., the media server 150 of FIGS. 1-2). As another example, graphical overlays may be inserted into a stream that is generated based on a playlist of VOD assets.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the media server 150 of FIGS. 1-2, the desktop/laptop computing device 171 of FIG. 1, the TV/set-top box 172 of FIG. 1, the smartphone 173 of FIG. 1, the tablet computer 174 of FIG. 1, the media server/stream relay server 181 of FIG. 1, a server (e.g., edge server) of the CDN 182 of FIG. 1, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

In a particular embodiment, a method includes receiving a stream at a media server. The method also includes scaling the stream at the media server to generate a scaled stream, where the scaled stream has a different frame size (e.g., a larger frame size or a smaller frame size) than the stream. The method further includes inserting one or more images into one or more frames of the scaled stream. The method includes encoding the scaled stream including the one or more images to generate an encoded stream. The method also includes sending the encoded stream to a computing device via an adaptive streaming protocol.

In another particular embodiment, a media server includes a processor and a decoder configured to decode a stream to generate a decoded stream. The media server also includes a first overlay module executable by the processor to insert one or more first images into at least one frame of the decoded stream to generate an intermediate stream. The media server further includes a video scaler configured to scale the intermediate stream to generate a scaled stream. The media server includes a second overlay module executable by the processor to insert one or more second images into at least one of frame of the scaled stream to generate a second intermediate stream. The media server also includes an encoder configured to encode the second intermediate stream to generate an encoded stream. The media server further includes a network interface configured to send the encoded stream to a computing device via an adaptive streaming protocol.

In another particular embodiment, a computer-readable storage device stores instructions that, when executed by a computer, cause the computer to receive a stream at a media server and to decode the stream to generate a decoded stream. The instructions, when executed by the computer, also cause the computer to insert one or more first images into at least one frame of the decoded stream to generate an intermediate stream. The instructions, when executed by the computer, further cause the computer to scale the intermediate stream to generate a scaled stream. The instructions, when executed by the computer, cause the computer to insert one or more second images into at least one of frame of the scaled stream to generate a second intermediate stream. The instructions, when executed by the computer, also cause the computer to encode the second intermediate stream to generate an encoded stream. The instructions, when executed by the computer, further cause the computer to send the encoded stream to a computing device via an adaptive streaming protocol.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer-readable medium comprising instructions that, when executed, cause a processor to perform operations including:
   receiving, at a media server, a request for a first adaptive bitrate rendition of a plurality of adaptive bitrate renditions of a stream, wherein at least two of the plurality of adaptive bitrate renditions have different bitrates;
   determining whether a first overlay image is enabled for the first adaptive bitrate rendition based on a first set of transcoding parameters identified by a transcoding template; and
   performing one of:
      inserting the first overlay image into at least one frame of a portion of the first adaptive bitrate rendition and sending the portion of the first adaptive bitrate rendition to a computing device when a transcoding parameter of the first set of transcoding parameters identified by the transcoding template indicates that the first overlay image is enabled; or
      sending the portion of the first adaptive bitrate rendition to the computing device without inserting the first overlay image into the at least one frame of the portion when the transcoding parameter of the first set of transcoding parameters identified by the transcoding template indicates that the first overlay image is not enabled.

2. A method comprising:
   receiving, at a media server, a request for a first adaptive bitrate rendition of a plurality of adaptive bitrate renditions of a stream, wherein at least two of the plurality of adaptive bitrate renditions have different bitrates;
   determining whether a first overlay image is enabled for the first adaptive bitrate rendition based on a first set of transcoding parameters identified by a transcoding template; and
   performing one of:
      inserting the first overlay image into at least one frame of a portion of the first adaptive bitrate rendition and sending the portion of the first adaptive bitrate rendition to a computing device when a transcoding parameter of the first set of transcoding parameters identified by the transcoding template indicates that the first overlay image is enabled; or
      sending the portion of the first adaptive bitrate rendition to the computing device without inserting the first overlay image into the at least one frame of the portion when the transcoding parameter of the first set of transcoding parameters identified by the transcoding template indicates that the first overlay image is not enabled.

3. The method of claim 2, further comprising:
   receiving, at the media server, a second request for a second adaptive bitrate rendition of the stream;
   determining whether a second overlay image is enabled for the second adaptive bitrate rendition; and
   inserting the second overlay image into at least one frame of a portion of the second adaptive bitrate rendition and sending the portion of the second adaptive bitrate rendition to a second computing device when a second transcoding parameter identified by the transcoding template indicates that the second overlay image is enabled.

4. The method of claim 2, wherein the transcoding template identifies at least one adaptive streaming parameter.

5. The method of claim 2, wherein the first adaptive bitrate rendition is requested by the computing device based on at least one of playback conditions at the computing device or network conditions at the computing device.

6. The method of claim 2, wherein the transcoding template includes data associated with at least one of a stream bitrate, an enabled or disabled image overlay, a path of an image, a display location, a display alignment, a display frame size, a display frame rate, a CODEC, a Z-order of the image, a display opacity, a number of audio channels, or a check for updates.

7. The method of claim 3, wherein at least one of the first overlay image or the second overlay image corresponds to a static overlay.

8. The method of claim 3, wherein at least one of the first overlay image or the second overlay image corresponds to a dynamic overlay.

9. The method of claim 2, further comprising scaling the stream to generate a plurality of scaled streams.

10. The method of claim 9, wherein the transcoding template identifies a number of the plurality of scaled streams and at least one parameter of at least one scaled stream of the plurality of scaled streams.

11. The method of claim 3, wherein the portion of the first adaptive bitrate rendition is sent to the computing device while the portion of the second adaptive bitrate rendition is sent to the second computing device.

12. A media server comprising:
   a memory configured to store a transcoding template;
   a processor; and
   a transcoder executable by the processor to:
      receive a request for a first adaptive bitrate rendition of a plurality of adaptive bitrate renditions of a stream, wherein at least two of the plurality of adaptive bitrate renditions have different bitrates;

determine whether a first overlay image is enabled for the first adaptive bitrate rendition based on a first set of transcoding parameters identified by the transcoding template; and perform one of:
  insert the first overlay image into at least one frame of a portion of the first adaptive bitrate rendition and send, by a network interface, the portion of the first adaptive bitrate rendition to a computing device when a transcoding parameter of the first set of transcoding parameters identified by the transcoding template indicates that the first overlay image is enabled; or
  send, by the network interface, the portion of the first adaptive bitrate rendition to the computing device without inserting the first overlay image into the at least one frame of the portion when the transcoding parameter of the first set of transcoding parameters identified by the transcoding template indicates that the first overlay image is not enabled.

13. The media server of claim 12, wherein the transcoder is further executable by the processor to:

receive a second request for a second adaptive bitrate rendition of the stream;

determine whether a second overlay image is enabled for the second adaptive bitrate rendition; and insert the second overlay image into at least one frame of a portion of the second adaptive bitrate rendition and send the portion of the second adaptive bitrate rendition to a second computer device when a second transcoding parameter identified by the transcoding template indicates that the second overlay image is enabled.

14. The media server of claim 12, wherein the transcoding template identifies at least one adaptive streaming parameter.

15. The media server of claim 12, wherein the first adaptive bitrate rendition is requested by the computing device based on at least one of playback conditions at the computing device or network conditions at the computing device.

16. The media server of claim 13, wherein the transcoding template includes data associated with at least one of a stream bitrate, an enabled or disabled image overlay, a path of an image, a display location, a display alignment, a display frame size, a display frame rate, a CODEC, a Z-order of the image, a display opacity, a number of audio channels, or a check for updates.

17. The media server of claim 13, wherein at least one of the first overlay image or the second overlay image corresponds to a static overlay.

18. The media server of claim 13, wherein at least one of the first overlay image or the second overlay image corresponds to a dynamic overlay.

19. The media server of claim 12, wherein the transcoder is executable by the processor to scale the stream to generate a plurality of scaled streams.

20. The media server of claim 19, wherein the transcoding template identifies a number of the plurality of scaled streams and at least one parameter of at least one scaled stream of the plurality of scaled streams.

* * * * *